United States Patent
Gupta (10) Patent No.: US 8,224,305 B2
(45) Date of Patent: Jul. 17, 2012

(54) SYSTEM AND METHOD FOR EXTENDING CONFERENCE COMMUNICATIONS ACCESS TO LOCAL PARTICIPANTS

(75) Inventor: Shekhar Gupta, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 704 days.

(21) Appl. No.: 11/980,904

(22) Filed: Oct. 31, 2007

(65) Prior Publication Data
US 2009/0111443 A1    Apr. 30, 2009

(51) Int. Cl.
H04M 3/42 (2006.01)
H04L 5/20 (2006.01)

(52) U.S. Cl. .............. 455/416; 370/260; 379/202.01

(58) Field of Classification Search ............ 455/416; 379/202.1, 202.01; 370/260
See application file for complete search history.

(56) References Cited

U.S. PATENT DOCUMENTS

| | | | |
|---|---|---|---|
| 4,555,592 A * | 11/1985 | Deinzer | 455/416 |
| 5,138,651 A * | 8/1992 | Sudo | 455/462 |
| 6,101,480 A | 8/2000 | Conmy et al. | |
| 6,859,417 B1 * | 2/2005 | Houg | 367/96 |
| 7,187,764 B2 * | 3/2007 | Ruetschi | 379/202.01 |
| 7,254,123 B2 * | 8/2007 | Jukarainen | 370/337 |
| 7,339,605 B2 * | 3/2008 | Rodman et al. | 348/14.07 |
| 7,529,566 B2 * | 5/2009 | Rodman et al. | 455/569.1 |
| 7,539,486 B2 | 5/2009 | Seligmann | 455/416 |
| 7,675,537 B2 * | 3/2010 | Wilson et al. | 348/14.01 |
| 7,801,570 B2 * | 9/2010 | Cheung et al. | 455/569.1 |
| 2003/0035406 A1 * | 2/2003 | Fraser et al. | 370/347 |
| 2003/0044654 A1 * | 3/2003 | Holt | 429/13 |
| 2004/0208303 A1 * | 10/2004 | Rajagopalan et al. | 379/202.01 |
| 2005/0152524 A1 * | 7/2005 | Carlson et al. | 379/202.01 |
| 2005/0286443 A1 * | 12/2005 | McMillen et al. | 370/260 |
| 2007/0117556 A1 * | 5/2007 | Rogalski | 455/416 |

FOREIGN PATENT DOCUMENTS

WO   WO 9903253 A1 *   1/1999

* cited by examiner

*Primary Examiner* — Nick Corsaro
*Assistant Examiner* — Michael S Bush
(74) *Attorney, Agent, or Firm* — Swanson & Bratschun, L.L.C.

(57) ABSTRACT

A system and method for wireless conferencing. A personal wireless device is linked with a conferencing system for implementing a conference call. Voice input is received from a user through the personal wireless device. The voice input is transmitted to the conferencing system in response to receiving the voice input. The voice input is broadcast through one or more speakers in communication with the conferencing system in response to determining the voice input may be inaudible to one or more users in a room.

19 Claims, 5 Drawing Sheets

SYSTEM AND METHOD FOR EXTENDING CONFERENCE COMMUNICATIONS ACCESS TO LOCAL PARTICIPANTS

BACKGROUND

The use and development of communications has grown nearly exponentially in recent years. The growth is fueled by larger wired and wireless networks with more reliable protocols and better communications hardware available to service providers and consumers. Based on these drastic improvements, users have come to expect upgrades, enhanced features and services, and more advanced communications devices that were unavailable only a few years ago.

In particular, conference calling has become very important. Conference calls may allow a large number of people to interact by carrying on verbal conversations despite distance and availability limitations. In many cases, conference calls are limited by technical and physical configuration of the conferencing telephone. Even when equipped with extensions, the conference telephone may be unable to sufficiently allow a large number of individuals to communicate with a remote party from within a single room. For example, everyone in the conferencing room may be unable to hear comments that are made by a party on the other side of the room or may be unable to make comments that are discernible by the remote party. As a result, even though conference calling allows for more efficient communication, it is not ideal for many situations.

SUMMARY

One embodiment includes a system and method for wireless conferencing. A personal wireless device may be linked with a conferencing system for implementing a conference call. Voice input may be received from a user through the personal wireless device. The voice input may be transmitted to the conferencing system in response to receiving the voice input. The voice input may be broadcast through one or more speakers in communication with the conferencing system in response to determining whether the voice input may be inaudible to one or more users in a room.

Another embodiment includes a telephone conferencing system. The system may include a conference telephone configured to enable a conference call by sending and receiving voice input. The system may also include one or more speakers in communication with the conference telephone for broadcasting voice input. The one or more cellular telephones may establish a wireless link with the conference telephone or the one or more speakers. The voice input may be received through the one or more personal wireless devices. The one or more speakers may broadcast the voice input through one or more speakers in response to determining whether the voice input maybe inaudible to one or more users in a conference room.

Yet another embodiment includes a conferencing system. The conferencing system may include a processor for executing a set of instructions and a memory for storing the set of instructions. The set of instructions may be configured to link one or more personal wireless devices with a conferencing system for implementing a conference call, receive voice input from one or more users through the one or more personal wireless devices, transmit the voice input to the conferencing system in response to receiving the voice input, and broadcast the voice input through one or more speakers in communication with the conferencing system in response to determining whether the voice input may be inaudible to one or more users in a room.

BRIEF DESCRIPTION OF THE DRAWINGS

Illustrative embodiments of the present invention are described in detail below with reference to the attached drawing figures which are incorporated by reference herein and wherein.

DETAILED DESCRIPTION OF THE DRAWINGS

Figure 1:
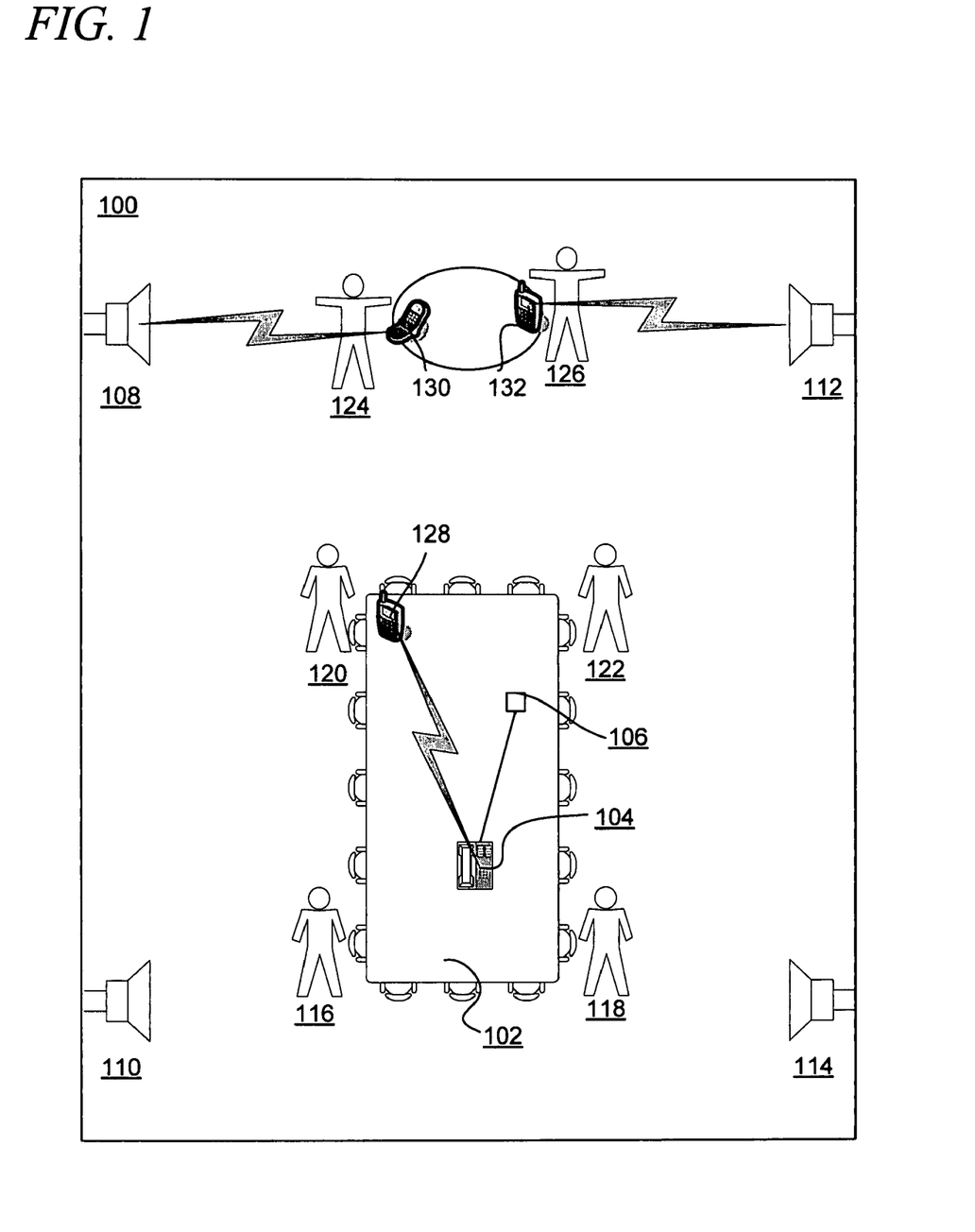
FIG. 1 is a pictorial representation of a conference room in accordance with an illustrative embodiment.

FIG. 1 is a pictorial representation of a conference room in accordance with an illustrative embodiment. FIG. 1 illustrates one embodiment of a conference room 100. The conference room 100 may further include conference table 102, conference telephone 104, extension 106, speakers 108, 110, 112 and 114, users 116, 118, 120, 122, 124 and 126, and wireless devices 128, 130 and 132. The conferencing system may include the conference telephone 104, the extension 106, and the speakers 108, 110, 112 and 114 as further described in FIG. 2.

In one embodiment, the conference room 100 may be a large room or a portion of a building or other enclosure. The conference room 100 may be an area designated for users to carry on meetings, conferences, or other gatherings. The conference telephone 104 may be a plain old telephone service (POTS) telephone, a voice over internet protocol (VoIP) telephone, or other similar telephonic communication device. The conference phone 104 may be specially designed or configured to enable telephone conferences with one or more users in the conference room 100 with one or more remote locations. For example, the users 116, 118, 120, 122, 124 and 126 may carry on a telephone conference with a regional office through the conference telephone 104. The conference telephone 104 may include logic, hardware, circuitry, and software for implementing the method herein described. In one embodiment, the conference telephone 104 may be integrated or networked to a server or other computing device enabling the conference telephone 104 to communicate with multiple devices within the conference room 100.

In one embodiment, the conference telephone 104 may be equipped with the extension 106. The extension 106 may allow other users, such as user 122, to provide additional voice input for the telephone conference. The conference telephone 104 may be equipped with multiple extensions that may be based in different areas of the room. In a second embodiment, the conference telephone 104 is insufficiently close to users 120, 124 and 126 to receive voice input and convey communications. The conference telephone 104 and extension 106 may be inadequately positioned based on the configuration of the conference room 100, distances separating users, number of users, or other criteria and factors. For example, users 124 and 126 may be accessing computing devices at a table within the conference room 100 that prevents them from being located at the conference table 102 within an acceptable communication range to the conference telephone 104.

In another embodiment, the conference table 102 may be completely filled with users participating in the conference call preventing users 124 and 126 from being seated or located in close proximity to the conference table 102. The users 120, 124 and 126 may use corresponding wireless devices 128, 130 and 132 to participate in the telephone conference. The wireless devices 128, 130 and 132 may wirelessly interface or link to a portion of the conferencing system. The wireless devices 128, 130 and 132 may be personal cellular telephones. However the wireless devices 128, 130 and 132 may be any personal wireless device suitable for enabling wireless communications through a wireless network. For example, the wireless devices 128, 130, and 132 may be a music player, remote control, laptop, personal digital assistant (PDA), pager, or other personal electronic device. The personal wireless device may be a device that a user may carry or utilize for business or personal purposes. In one embodiment, the wireless devices 128, 130 and 132 may enable communication through a CDMA, TDMA, GSM or other similar cellular network. The wireless network may alternatively be a data network, such as WiFi, GMRS, or WiMAX.

In another embodiment, the wireless devices 128, 130 and 132 may connect to the nearest element of the conferencing system. For example, the wireless device 130 may connect to speaker 108. Wireless device 132 may connect to speaker 112, and wireless device 128 may connect to the extension 106 or to the conference telephone 104. The wireless connection or link established between the wireless devices 128, 130 and 132 and elements of the conferencing system may be a Bluetooth® connection. However, the wireless communication occurring between the different elements and devices may be any communications link signal, standard, or protocol suitable to exchange data. The determination of which element of the conferencing system to connect to may be made based on a received signal strength or from a command sent from the conferencing system to the applicable wireless device.

In another embodiment, the wireless connection may be a WiFi or other radio frequency signal. The speakers 108, 112 and 114, as well as the conference telephone 104 and the extension 106, may broadcast voice signals received from a remote party to the users 116, 118, 120, 122, 124 and 126.

In one embodiment, each of the aforementioned elements may also include a microphone for receiving voice input from the users 116, 118, 120, 122, 124 and 126. As a result, the voice input may be received through the extension 106 and the conference telephone 104 or through the speakers 108, 110, 112 and 114. The voice communications received from the users 120, 124 and 126 may communicate directly to an element of the conferencing system or through the wireless devices 128, 130 and 132 through a conferencing number or connection to remote users. For example, the wireless device 130 may be linked directly to the speaker 108 so that voice communications from the user 124 are also broadcast through the other speakers 110, 112, and 114 and the conference telephone 104 so that the voice communications may be distinguished by the other users, and in particular, the users 116, 118, 120 and 122 that may be a distance away from user 124.

A conference call is a communication enabling two or more individuals or groups to communicate between two or more locations. The conference call may be initiated or enabled with the one or more individuals calling each other directly or a conferencing phone number specially designated to host a conference call. For example, the conferencing phone number may include a number of special features for managing, coordinating, and enhancing the conference call.

Additionally, because of the distance between users 124 and 126 and the conference telephone 104, the wireless devices 130 and 132 may allow the users 124 and 126 to effectively participate in the conference call. Similarly, the voice communications sent by the wireless devices 130 and 132 may be communicated to the speakers 108 and 112 so that the signals may be additionally communicated and/or played through the speakers 110 and 114, as well as the conference telephone 104 and extension 106. The conference system may employ voice, echo, and noise cancellation, as well as feedback control to ensure that voice import from any of the users 116, 118, 120, 122, 124 and 126 does not feedback into the system, thereby convoluting or distorting the voice signals distinguishable by the users 116, 118, 120, 122, 124 and 126, as well as remote users.

The wireless devices 128, 130 and 132 may also be enabled to transmit video, pictures, files, instructions, or software to the conferencing system for display to users within the conference room 100 or for display to remote users. For example, user 126 may access the wireless device 132 to display a chart showing growth statistics for the month to all of the users through the connection between the wireless device 132 and the speaker 112, which in turn communicates with the conference telephone 104. As shown, the user 120 maybe able to speak into the wireless device 128 instead of the extension 106 in order to further communicate a perceptible voice signal through the conference number carried by the conference telephone 104. The voice input received from the user 126 through the wireless device 132 may be communicated directly by the wireless device 132 through a conference number, or the wireless device 132 may convey the voice input to the speaker 112 which conveys the voice input to the conference telephone 104 to be communicated through the conferencing connection. The voice input may be transmitted from the speaker 112 to the conference telephone 104 electronically or by broadcasting an audible signal that is received by the conference telephone 104 as if the user 126 were speaking directly into the conference telephone 104. In another embodiment, the wireless device 132 may stream video of the user directly through the conferencing number or intermediately through the speaker 112 and the conference telephone 104. The video feature through one or more of the wireless devices 128, 130 and 132 may be constantly activated or may be activated only when one of the users 120, 124 or 126 is speaking. For example, a remote party that is participating in a video conference call may be shown video from one of the wireless devices 128, 130, and 132 when the respective user is speaking 120, 124 or 126.

Figure 2:
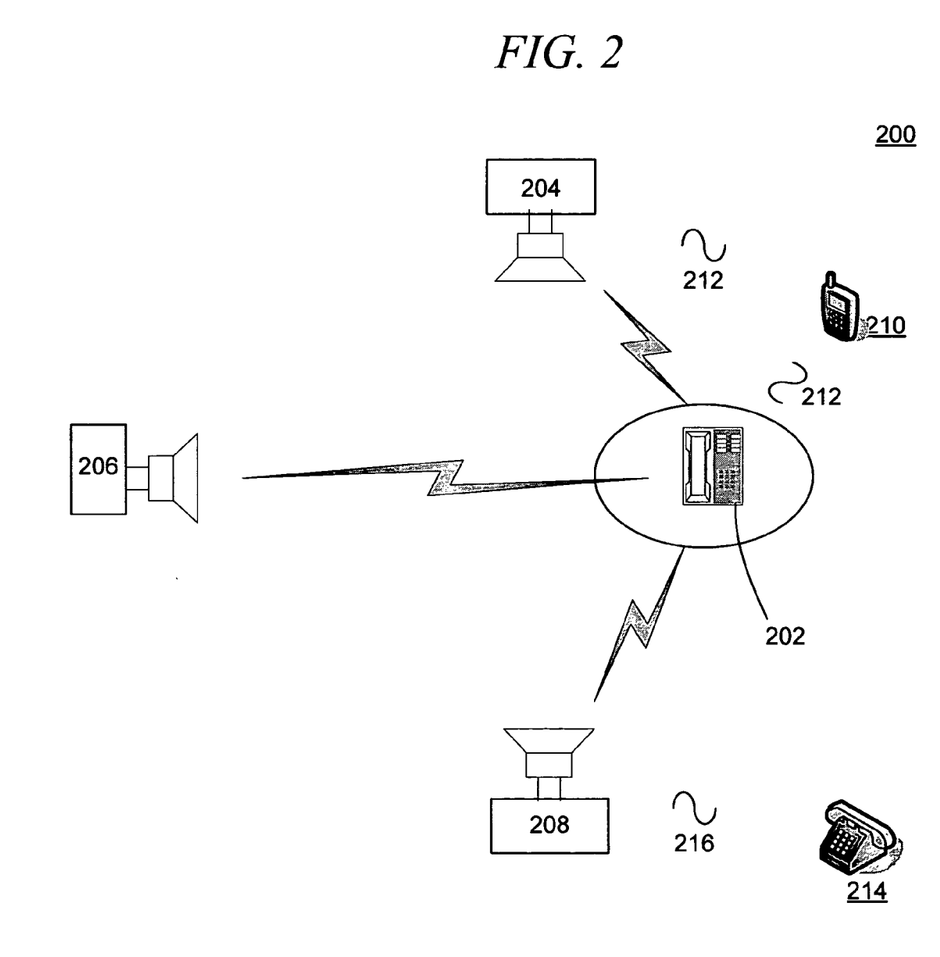
FIG. 2 is a conferencing system in accordance with an illustrative embodiment.

FIG. 2 is a conferencing system in accordance with an illustrative embodiment. FIG. 2 further illustrates one embodiment of the conferencing system 200. In this embodiment, the conferencing system 200 may include a conference telephone 202 and speakers 204, 206 and 208. The conferencing system 200 may further communicate with a wireless device 210 through a wireless signal 212 and a telephone 214 communicating through wireless signal 216.

In another embodiment, the speakers 204, 206 and 208 wirelessly communicate with the conference telephone 202 and the wireless device 210 and telephone 214. In another embodiment, the elements of the conferencing system, with the exception of the wireless device 210 and the telephone 214, may communicate through a wired connection. Similarly, the conference telephone 202, telephone 214, and speakers 204, 206 and 208 maybe hardwired to a power source or outlet.

In another embodiment, the speakers 204, 206 and 208 may be battery powered or rechargeable in order to allow the speakers 204, 206 and 208 to be portable and positioned as needed within a room. As previously described, the wireless device 210 may be accessed by a user in order to facilitate a conference call. In particular, the wireless device 210 may wirelessly communicate with the speaker 204 or the conference telephone 212. The wireless device 210 may also wirelessly communicate with one or more other wireless devices, a projector, or other equipment or computing devices that maybe integrated or utilized for purposes of a conference call.

In one embodiment, the wireless device 210 may wirelessly communicate with all of the elements of the conferencing system 200. As shown, the wireless device 210 communicates with the speaker 204 and the conference telephone 202 through the wireless signal 212 based on the proximity to those elements. The telephone 214 may be a standard or VoIP telephone enabled to wirelessly communicate with elements of the conferencing system 200. For example, as shown, the telephone 214 may communicate with the speaker 208 through the wireless signal 216. As a result, even if a user in proximity to the telephone 214 is unable to participate in a conference call by speaking directly into the conference telephone 202 or a leaf or extension of the conference telephone 202, the voice signals received by the telephone 214 may be communicated through the voice signal 216 to the speaker 208. As a result, other users within the room may be able to hear what the user has spoken into the telephone 214 as the voice signal is repeated through the speaker 208 and/or the other conferencing elements, including speaker 204, 206 and the conference telephone 202. In one embodiment, the voice input received through the telephone 214 or wireless device 210 may be repeated through the speakers 204, 206, 208 and/or the conference telephone 202 if the voice input is inaudible or imperceptible to one or more users in the conference room. The determination of whether the voice input is inaudible may be made based on user input or automatically. For example, the conferencing system 200 may measure decibel, volume, or signal amplitude readings at one or more points or locations to automatically determine whether the voice input meets specified thresholds indicating the voice input is or should be audible to the participants in the conference room. The elements of the conferencing system 200 may further include sensors for making a determination regarding whether the voice input is audible. For example, if the voice input is below a threshold, the voice input may be broadcast through the speakers 204, 206, and 208 for the benefit of other individuals in the conference room or other participants in the conference call.

Figure 3:
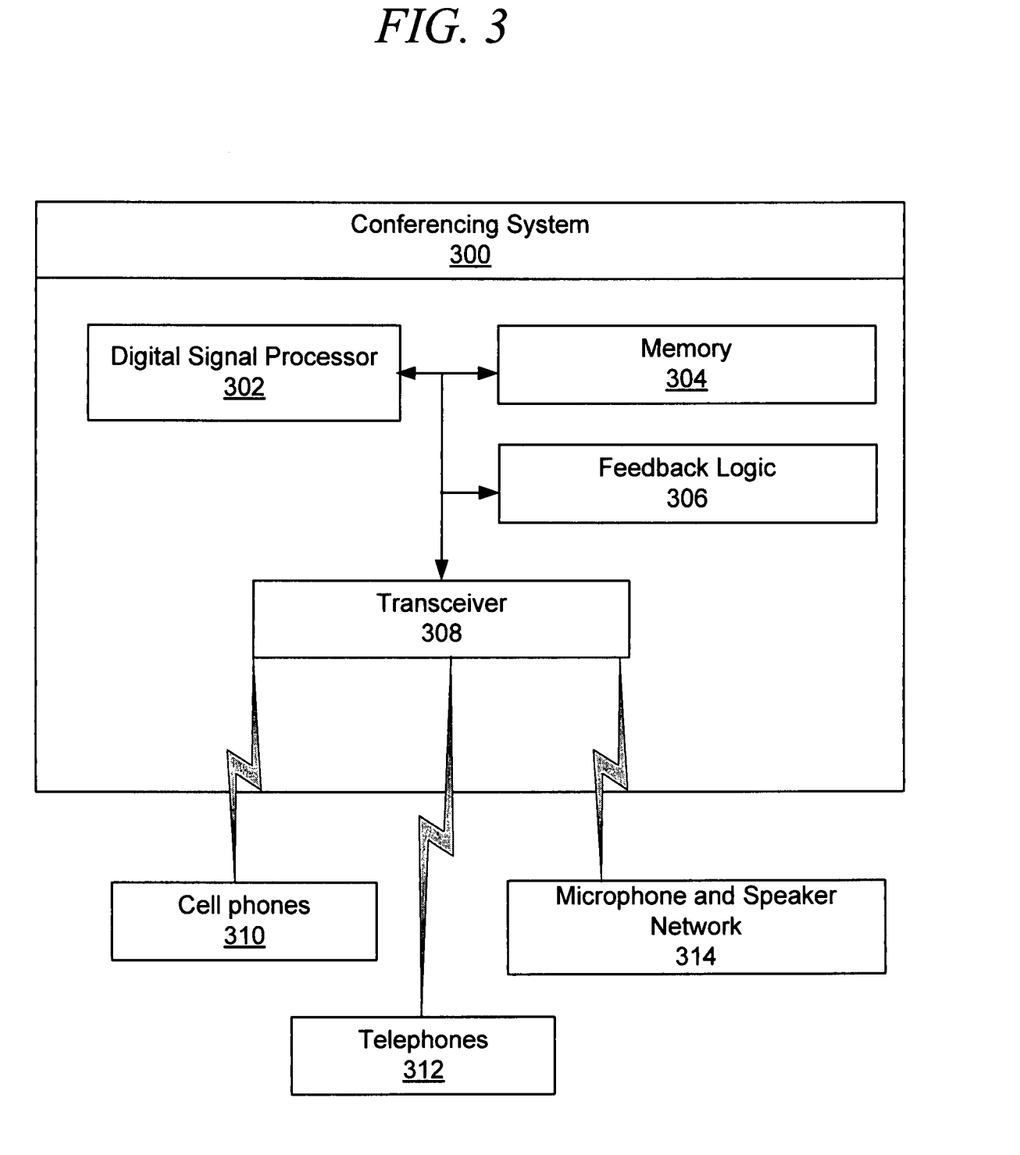
FIG. 3 is a block diagram of a conferencing system in accordance with an illustrative embodiment.

FIG. 3 is a block diagram of a conferencing system in accordance with an illustrative embodiment. FIG. 3 includes the conferencing system 300. The conferencing system may include a digital signal processor 302, a memory 304, feedback logic 306 and a transceiver 308. The conferencing system 300 may further communicate through the transceiver 308 with cell phones 310, telephones 312, and a microphone and speaker network 314.

The conferencing system 300 maybe a combination of hardware and software elements and may be implemented using various structures and implementations. The example shown in FIG. 3 is given for illustration purposes only, and not as a limitation of required elements. The conferencing system 300 may be enabled to provide integrated voice or video conferencing though any number of devices using wireless communication. The conferencing system 300 is a particular implementation of the conference telephone 104 of FIG. 1.

The digital signal processor 302 may be a signal processing device, logic, generator, or amplifier. The digital signal processor 302 may also be any processing device suitable for processing communications signals, instructions, and software. In another embodiment, the digital signal processor may include other hardware and/or software implementing for communicating and interfacing with a number of wirelessly-connected devices.

In particular, the digital signal processor 302 may include various pre-amplifiers, power amplifiers, digital-to-analog converters, and audio CODECs to dynamically generate a coherent signal that maybe transmitted through a conference connection or conference number. Since, each person naturally speaks at a different volume level, the digital signal processor 302 may use an amplifier to amplify, filter, or otherwise modify voice signals received by the conferencing system so that the voice input is distinguishable by individuals within a conference room or one or more remote parties.

The memory 304 may be a storage medium, such as flash memory or dynamic random access memory. However, the memory may be a hard disk read-only memory, or another suitable form of volatile or nonvolatile memory. The memory 304 may store user preferences, data, information, applications, and instructions for execution by the digital signal processor 302 to implement the wireless conferencing of the conferencing system 300, and other electronic data used to implement the various features of the conferencing system 300. In one embodiment, the features and methods herein described may be implemented in software instructions that are stored in the memory 304 for execution by the digital signal processor 302.

The conferencing system 300 may include the feedback logic 306 or feedback loop, circuitry, or software for ensuring that the voice communication signal being communicated through the cell phones 310, telephones 312, and microphone and speaker network 314 do not overlap or feed back into the conferencing system 300 generating voice and noise signals that may be diluted, convoluted, or otherwise indistinguishable to a remote party or individuals within the same room as the conferencing system 300. The feedback logic 306 may include an adaptive or dynamic filter for filtering the voice signals that feed back into the conferencing system 300 through any of the externally connected devices. As a result, the users are able to carry on a conference call clearly even though the signals and associated speech may overlap or experience feedback.

The microphone and speaker network 314 may be an audio input device configured to receive the audio input, voice communications, and other noises from the user. The microphone and speaker network 314 electronically communicates the voice communication signal to the digital signal processor 302. The digital signal processor 302 may process or modify the voice communications signal in order to convey the signal to one or more remote parties directly or through a conferencing number.

The conferencing system 300 may also include the hardware and software that implements the normal features and functions of a conference phone. For example, the conferencing system 300 may include all logic, transceivers, displays, interfaces, and other elements that enable the conferencing system 300 to perform the standard features of a conference telephone.

The cell phones 310, telephones 312, and microphone and speaker network 314 may communicate with the conferencing system 300 through the transceiver 308. In one embodiment, the cell phones 310 and telephones 312 may be required to establish a link through a password, device identification, or other authentication. In another embodiment, the transceiver 308 may automatically establish a connection with the cell phones 310 and the telephones 312 once a user has provided input or a selection to link up with the conferencing system 300. The user input to link with the conferencing system 300 may be received through the conferencing system 300 or through the cell phones 310 or the telephones 312.

As previously described, the microphone and speaker network 314 may also communicate with the transceiver 308. The microphone and speaker network 314, the telephones 312, and the cell phones 310 may communicate by using the same radio frequency or different radio frequencies in order to prevent noise, cross-talk or other interference between the devices. For example, the microphone and speaker network 314 may communicate with the conferencing system 300 using a WiFi connection. Further, the cell phones 310 and the telephones 312 may communicate with the transceiver 308 of the conferencing system 300 using a Bluetooth® connection. The microphone and speaker network 314 may be positioned within the conference room in order to maximize audio input and output to the users.

In one embodiment, the microphone and speakers may be integrated devices. In another embodiment, the microphone and speakers of the microphone and speaker network 314 may be separate devices that wirelessly communicate with the transceiver 308. The microphone and speaker network 314 may alternatively communicate with the conferencing system 300 through a wired connection. For example, the microphone and speaker network 314 may be built in or installed in a conference room in order to maximize conferencing communications that occur within the room.

The conferencing system 300 may further include one or more displays for displaying graphics, video, pictures, files, or other data. The conferencing system 300 may communicate by using a traditional phone line, VoIP, a data connection, or other communications connection. The conference call may be implemented between any number of parties, each of which may be using a system that may mirror the conferencing system 300.

Figure 4:
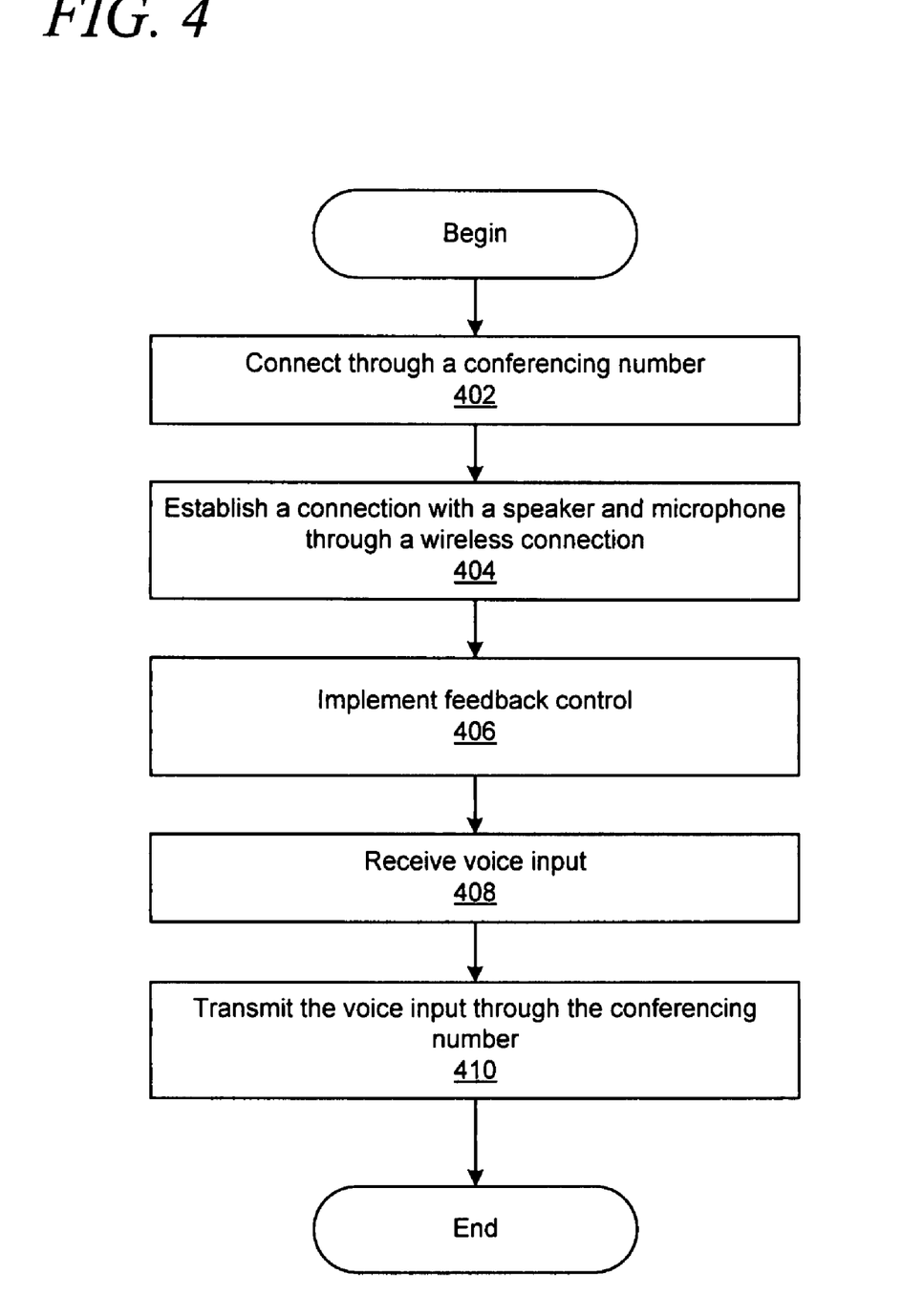
FIG. 4 is a flowchart of a process for telephone conferencing in accordance with an illustrative embodiment.

FIG. 4 is a flowchart of a process for telephone conferencing in accordance with an illustrative embodiment. The process of FIG. 4 may be implemented by a wireless device. Alternatively, the process may be implemented by one or more elements of a conferencing system. The process begins with the wireless device connecting to a telephone conference through a conferencing number (step 402). The conferencing number may have been previously provided to the user or may be part of a link or telephone number accessible from the wireless device. For example, the wireless device may automatically connect to the conferencing number and provide an authentication or password as required or that information may be provided based on manual input.

Next, the wireless device establishes a connection with a speaker and microphone through a wireless connection (step 404). In one embodiment, the speaker and microphone may be a single integrated wireless device that communicates with a cellular telephone. The speaker and microphone may be one element of a conferencing system and may additionally communicate with a conferencing telephone, server, or element of the conferencing system.

Next, the wireless device implements feedback control (step 406). The feedback control may ensure that voice signals echoing or otherwise propagating throughout a room do not interfere with the voice signal that is transmitted through the telephone conference. Feedback control may include noise cancellation, voice cancellation, and echo cancellation to further ensure that only that communication including a user's voice is clarified, or otherwise filtered to make the verbal conversations within the room or transmitted to remote parties more distinguishable.

The wireless device receives voice input (step 408). The voice input may be received through wireless devices placed near the mouth of the user. Alternatively, the user may use an accessory, such as an earpiece using a hard connection or wireless link to communicate with the wireless device. In yet another embodiment, the wireless device may employ a speaker phone feature in order to receive voice input, as well as broadcast signals received through the conferencing number to the user.

Next, the wireless device transmits the voice input through the conferencing number (step 410). The wireless device may transmit the voice input directly through the conferencing number to remote parties. Alternatively, the wireless device may transmit the voice input to a conference telephone or the conference system for transmission to the remote parties. For example, in order to further control feedback and to ensure quality transmissions, the wireless device may receive voice input from a user that is broadcasted through speakers within a conference room. The voice input is also directly or indirectly transmitted from the wireless device to a conference telephone as a single point of communication for all of the users within the conference room to communicate with one or more remote parties.

Figure 5:
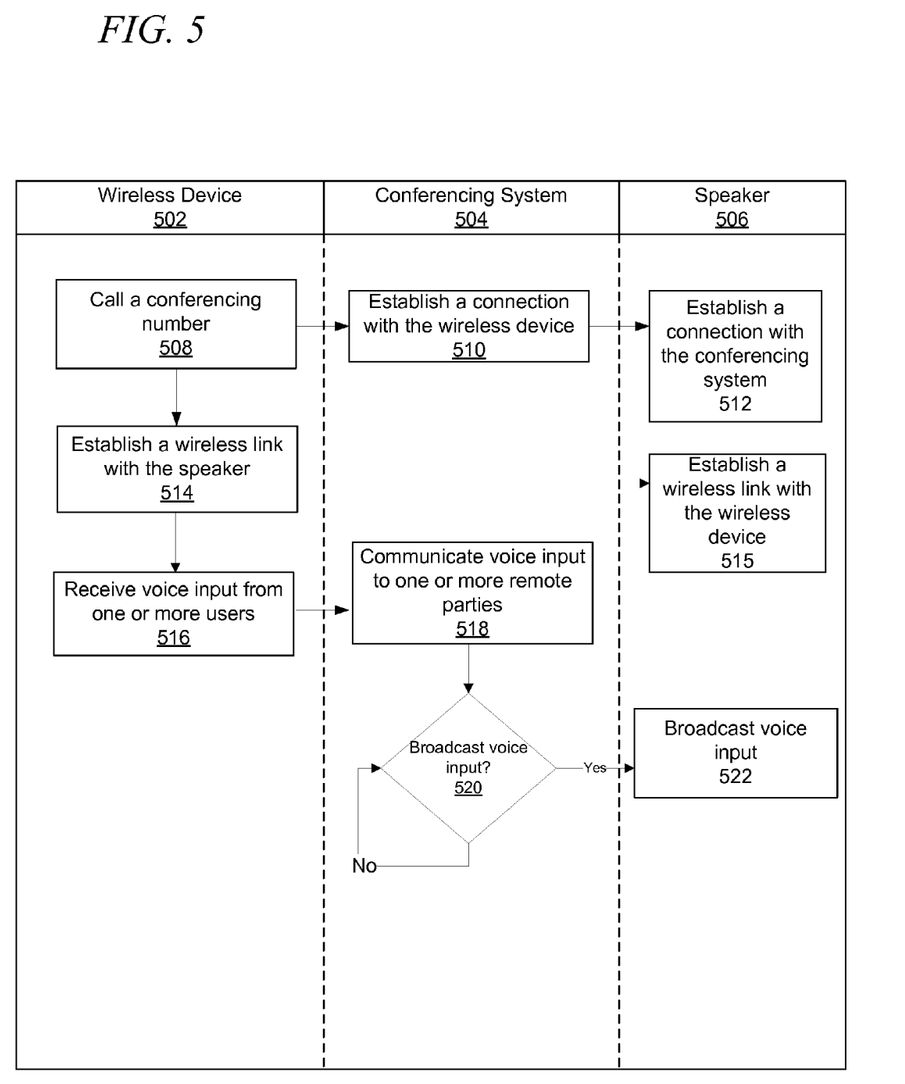
FIG. 5 is a flowchart of a process for telephone conferencing in accordance with an illustrative embodiment.

FIG. 5 is a flowchart of a process for telephone conferencing in accordance with an illustrative embodiment. The process of FIG. 5 may be implemented by a wireless device 502, a conferencing system 504, and a speaker 506. The conferencing system 504 may include the speaker 506, or alternatively, the device may communicate or be otherwise linked.

The process begins with the wireless device 502 calling a conferencing number (step 508). The conferencing system 504 establishes a connection with the wireless device (step 510). The connection of step 510 may be established based on user input at the wireless device 502 or at the conferencing system 504. For example, a user may activate the conferencing system 504 to search for available wireless devices that may automatically connect to the conferencing system 504. The conferencing system 504 may have been previously connected to a conference number, or it may implement a conferencing call and during step 508 the wireless device 502 is connected to or dialed into that conferencing number.

Alternatively, the wireless device 502 may establish a wireless connection with the conferencing system 504 without dialing a conferencing number or otherwise connecting to a conference call. For example, the process of FIG. 5 may be implemented without using the wireless service, such as a cellular network, in order to make a call to the conferencing number.

Next, the speaker 506 establishes a connection with the conferencing system (step 512). The connection may be established automatically or once the conferencing system 504 is enabled or a conference call is initiated. For example, once a user begins dialing a number through a conference telephone of the conference system 504, the conferencing system 504 on the speaker 506 may automatically establish a wireless connection. Alternatively, the speaker 506 may be hard wired to the conferencing system 504.

After calling a conference number (step 508), the wireless device 502 may establish a wireless link with the wireless speaker (step 514). Similarly, the speaker 506 establishes the wireless link with the wireless device (step 515). The wireless link allows voice input received by the wireless device during step 502 to be transmitted to the conferencing system 504 or through the conference number or conference call that has previously been established. Next, the wireless device 502 receives voice input from one or more users (step 516). The voice input maybe received through a speaker or through a microphone of the wireless device 502.

The conferencing system 504 communicates the voice input to one or more remote users (step 518). The voice input may be communicated in step 518 through a telephone or data connection. For example, the conferencing system 504 may include a conference telephone enabled with a standard analog connection, or it may include a VoIP telephone enabled for conferencing, since the conferencing system 504 determines whether to broadcast the voice input (step 520). The determination of step 520 may be made based on whether voice input is audible or perceptible to one or more users within the conference room. For example, in the event that there are a large number of users within a conference room separated by large distances, the user accessing the wireless device 502 and a user in another portion of the room, may be unable to hear one another. As a result, as the voice input is received by the wireless device 502, the conferencing system 504 determines whether the voice input should be played through the speaker 506.

If the conferencing system 504 determines not to broadcast the voice input process, that determination is repeated. If the conferencing system 504 determines to broadcast the voice input 520, the speaker 506 broadcasts the voice input (step 522). The broadcast of step 522 is played in order to ensure that all of the users within a conference room are able to perceive or hear the voice input received through the wireless device 502.

The illustrative embodiments may allow a number of users to communicate during a conference call using a personal wireless device. As a result, the users do not need to crowd around a single conference phone or extensions. The speakers enable everyone to hear the conversation from within the room and from one or more remote parties. The wireless devices may also be used to project files, information, pictures, or video as desired.

The previous detailed description is of a small number of embodiments for implementing the invention and is not intended to be limiting in scope. The following claims set forth a number of the embodiments of the invention disclosed with greater particularity.

What is claimed:

1. A method for extending conferencing, the method comprising:
    directly linking one or more personal wireless devices with a conferencing system wirelessly through a data connection for implementing a conference call, the one or more personal wireless devices are independently enabled to be utilized by one or more users for communications when not linked to the conferencing system;
    receiving voice input from one or more users through the conferencing system and the one or more personal wireless devices, wherein the voice input is enabled to be received through a speaker phone system of the one or more personal wireless devices;
    transmitting the voice input to the conferencing system in response to receiving the voice input;
    communicating the voice input through the conference call to one or more remote parties; and
    broadcasting the voice input through one or more speakers in communication with the conferencing system in response to determining the voice input is inaudible to one or more users in a room, wherein the one or more personal wireless devices communicate directly with the one or more speakers to broadcast the voice input.

2. The method according to claim 1, wherein the one or more personal wireless devices are a cellular telephones.

3. The method according to claim 1, wherein the directly linking is performed using either a Bluetooth® or WiFi connection.

4. The method according to claim 1, further comprising:
    broadcasting a voice signal received from one or more remote parties through the conferencing system, one or more speakers, and the one or more personal wireless devices.

5. The method according to claim 1, displaying graphics associated with the conference call to the one or more personal communications devices.

6. The method according to claim 5, further comprising:
    enabling the conferencing system to establish the data connection as a wireless link with the one or more personal wireless devices.

7. The method according to claim 1, further comprising:
    implementing feedback control to prevent the voice input from being distorted; and
    transmitting the voice input to one or more remote parties.

8. The method according to claim 1, further comprising:
    determining a distance between the one or more personal wireless devices and the conferencing system in order to determine whether the voice input is inaudible to the one or more users.

9. The method according to claim 1, further comprising;
    determining the voice input is inaudible based on user input, wherein the one or more speakers is activated to broadcast the voice input based on the determination.

10. The method according to claim 1, wherein voice communications from a party on another end of the conference call are broadcast by the speaker system of the one or more personal wireless devices, and wherein the speaker phone system of the one or more personal wireless devices include a microphone for receiving input to the conference call and a speaker for communicating an output of the conference call.

11. The method according to claim 1, wherein the voice input is transmitted through the conferencing system.

12. A telephone conferencing system, the system comprising:
    a conference telephone configured to enable a conference call by sending and receiving voice input;
    one or more speakers in communication with the conference telephone for broadcasting voice input; and
    one or more personal wireless devices in direct communication with the one or more speakers to broadcast the voice input, wherein the conference telephone, one or more speakers and one or more personal wireless devices provide for:
    directly linking one or more personal wireless devices with a conferencing system wirelessly through a data connection for implementing a conference call, the one or more personal wireless devices are independently enabled to be utilized by one or more users for communications when not linked to the conferencing system;
    receiving voice input from one or more users through the conferencing system and the one or more personal wireless devices, wherein the voice input is enabled to be received through a speaker phone system of the one or more personal wireless devices;
    transmitting the voice input to the conferencing system in response to receiving the voice input;
    communicating the voice input through the conference call to one or more remote parties; and broadcasting the voice input through one or more speakers in communication with the conferencing system in response to determining the voice input is inaudible to one or more users in a room.

13. The system according to claim 12, wherein the conference telephone implements feedback control to ensure that the voice input is not distorted and the teleconferencing system and the one or more personal wireless devices do not experience feedback.

14. The system according to claim 12, wherein the speaker phone functions of the one or more personal wireless devices include a microphone and one or more speakers, and wherein the conference telephone receives the voice input spoken by the one or more users into the one or more personal wireless devices as audible input broadcast from the one or more speakers in communication with the conference telephone.

15. A conferencing system comprising:
a processor for executing a set of instructions; and
a memory for storing the set of instructions, wherein the set of instructions are configured to:
directly link one or more personal wireless devices with a conferencing system wirelessly through a data connection for implementing a conference call, the one or more personal wireless devices are independently enabled to be utilized by one or more users for communications when not linked to the conferencing system;
receive voice input from one or more users through the conferencing system and the one or more personal wireless devices, wherein the voice input is enabled to be received through a speaker phone system of the one or more personal wireless devices;
transmit the voice input to the conferencing system in response to receiving the voice input;
communicate the voice input through the conference call to one or more remote parties; and
broadcast the voice input through one or more speakers in communication with the conferencing system in response to determining the voice input is inaudible to one or more users in a room, wherein the one or more personal wireless devices communicate directly with the one or more speakers to broadcast the voice input.

16. The conferencing system according to claim 15, wherein the one or more personal wireless devices are personal cellular telephones, and wherein the direct link is performed using a Bluetooth connection or WiFi connection.

17. The conferencing system according to claim 15, wherein the voice input is received by the one or more personal wireless devices operating in a speaker phone mode.

18. The conferencing system according to claim 15, wherein the set of instructions determines a distance between the personal wireless devices and the conferencing system in order to determine whether the voice input is inaudible to the one or more users, and wherein the one or more speakers broadcasts the voice input in response to determining the voice input is not audible.

19. The conferencing system according to claim 15, wherein the set of instructions determines the voice input is inaudible to the one or more users based on user input through the conferencing system or one or more personal wireless devices, wherein the one or more speakers are activated to broadcast the voice input based on the determination that the voice input is inaudible.

* * * * *